March 26, 1957  G. D. PERKINS  2,786,994

BEACON SYSTEM

Filed May 6, 1946

INVENTOR
GEORGE D. PERKINS

BY

ATTORNEY

United States Patent Office 2,786,994
Patented Mar. 26, 1957

2,786,994

BEACON SYSTEM

George D. Perkins, Salem, Mass., assignor, by mesne assignments, to the United States of America as represented by the Secretary of the Navy Application May 6, 1946, Serial No. 667,504

9 Claims. (Cl. 343—6.8)

This invention relates to electrical apparatus and more particularly to a highly directive beacon for use with radar systems.

In the bombardment of shore installations by a ship's heavy guns, or the bombing of a particular target from aircraft, it is necessary that the fire control system on the ship or aircraft receive accurate information as to target location. It is true that the reflected energy from a target to a radar system will give some indication of target location, but since ground targets are not usually isolated to a degree where they can be well discerned, it is necessary that other methods be employed to give accurate target location information. This can best be done by locating shore beacons near the target to be bombarded which will transmit energy to the radar system and thus provide range and bearing information. To obtain accurate position information it is necessary to use directional antennas at the beacon.

The primary object of the present invention is to provide a beacon that gives positional data to an interrogating radar.

Another object of the present invention provides a beacon method of giving accurate positional data to an interrogating radar without requiring directional antennas at the beacon.

A further object of the present invention is to provide a beacon that operates on frequencies much lower than those used in radar systems, thus making possible the use of more simple and conventional circuits.

The foregoing and other objects will become apparent from the detailed description when taken with the accompanying drawings, in which.

Figure 1:
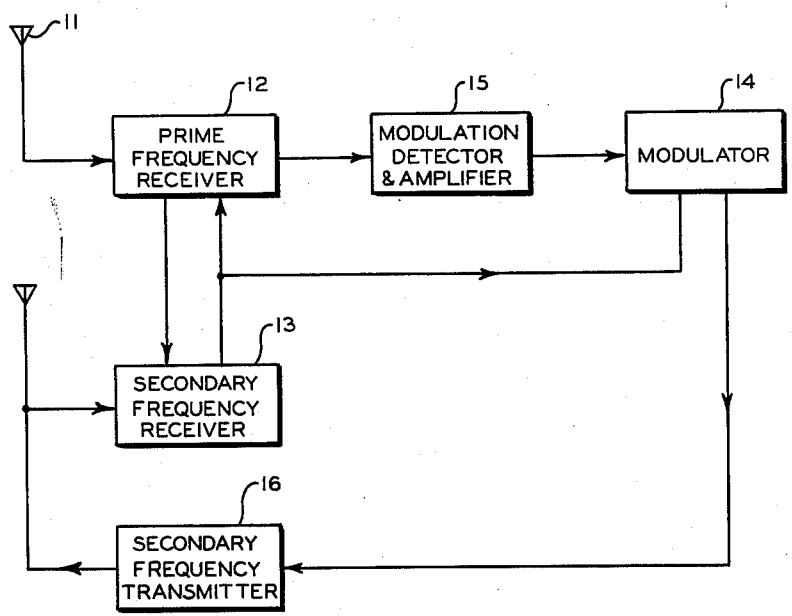
Fig. 1 is a block diagram of the beacon system.

Radar systems adapted for use in gunlaying applications use an antenna which produces a narrow beam and a conical scan coverage, the rate of rotation of the scanning beam being rather slow. As the radar beam scans across omnidirectional antenna 11, Fig. 1, the strength of the signal striking the antenna will vary cyclically in amplitude at the scanning frequency. It is apparent that when the radio frequency axis of the scanning antenna is pointed directly at antenna 11 there will be no modulation at the antenna scanning frequency of the signal received. This modulation information received from the radar is retransmitted on a different frequency, and upon receipt at the radar site is fed to the usual position indicating circuits. This invention provides a method for detecting and retransmitting this modulation information. Primary frequency receiver 12 is a wide pass band receiver adapted to receive the high frequency pulses of the interrogating radar. In addition, to prevent triggering of the beacon by any radar system operating in the vicinity, secondary frequency receiver 13 is used to receive lower frequency pulses also transmitted by the interrogating radar. These secondary frequency pulses are of a somewhat wider pulse width and of lower pulse repetition frequency than the primary frequency signal, and are synchronized with the primary frequency pulses in a definite down-counted ratio. Receivers 12 and 13 are so related that received signals have no effect on the rest of the circuit unless coincident pulses are received by both receivers. When this coincidence occurs, the output of receiver 13 activates an automatic gain control feature of receiver 12 so that the variation in amplitude of the received radar pulses appears in the output. The output of receiver 13 also activates modulator 14. From the discussion thus far it is apparent how the beacon is made to respond to only interrogating radars that have synchronized primary and secondary frequency interrogating outputs. At modulation detector and amplifier 15, the amplitude variation of the pulses received by receiver 12 are integrated, amplified, and used to vary the voltage applied to modulator 14. The variation in applied voltage varies the amplitude of the modulator output, and consequently the power output of plate modulated secondary frequency transmitter 16. The frequency of transmitter 16 may be the same as the secondary frequency of the interrogating radar, or any other desired frequency. It is desirable, however, to use a low frequency so that simple circuit components which produce high power output with minimum weight can be used.

Figure 2:
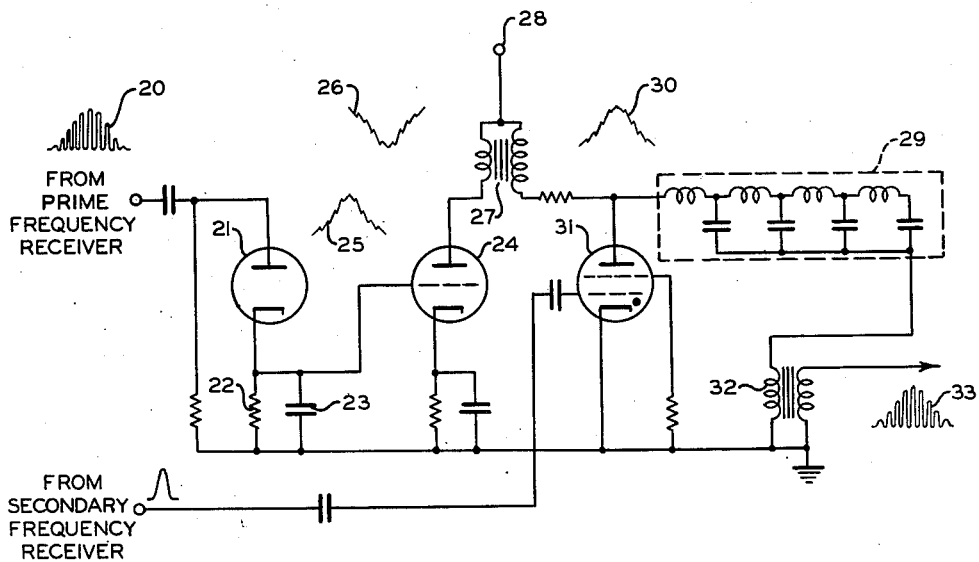
Fig. 2 is a schematic diagram of the modulation detector, amplifier and modulator used in this invention.

The method of detection and modulation can be more clearly understood by reference to Fig. 2. The signal output 20 of the prime frequency detector is a series of pulses which vary in amplitude at the scanning frequency and a repetition rate determined by the synchronism of the primary and secondary frequency interrogating pulses as described above. These pulses pass through diode 21 and are integrated by resistor 22 and condenser 23 to produce on the grid of amplifier triode 24 a signal resembling curve 25. This is amplified and wave form 26 appears on the primary of transformer 27. The secondary of transformer 27, connected between a source of D. C. voltage at terminal 28 and storage line 29, serves as a charging choke, and the superimposed modulation represented by signal 30 will vary the voltage to which storage line 29 will charge. Thyratron 31 is triggered into operation by the signal from the secondary frequency receiver, the repetition rate of which is also determined by the synchronism of the interrogating primary and secondary frequency pulses, and storage line 29 is discharged into transformer 32. The secondary of transformer 32 applies the modulation power output, similar to curve 33, to the secondary frequency transmitter. The output of this transmitter then varies in amplitude corresponding to the variation of the incoming signal to the beacon. This signal is received at the radar on a supplementary receiver and fed to position indicating circuits and the desired positional information is derived.

The invention described in the foregoing specification need not be limited to the details shown which are considered illustrative of one form the invention may take.

What is claimed is:

1. A radar beacon which provides accurate positional data comprising, a primary frequency receiver, a secondary frequency receiver, said primary and said secondary receivers being so related as to be sensitive to a coded interrogation, a modulation detector for detecting amplitude modulation of the signal received by said primary frequency receiver from the interrogating radar, a modulator, said modulator being triggered by the output of said secondary receiver, the output of said detector being applied to said modulator, and a radio frequency transmitter, the output of said modulator being applied to said transmitter, the output of said transmitter being amplitude modulated in the same manner as the signal received from said interrogating radar.

2. A beacon for use with a radar system radiating interrogating impulses on first and second frequencies and having a scanning antenna comprising, a first receiver responsive to said first frequency and having omnidirectional reception characteristics, a second receiver responsive to said second frequency having omnidirectional reception characteristics, means for detecting and integrating the amplitude modulations in the output of said first receiver to develop a voltage varying in amplitude at the scan frequency, a coincidence circuit, means for applying the output of said detecting and integrating means to said coincidence circuit, means for applying the output of said second receiver to said coincidence circuit, a transmitter, and means for modulating said transmitter with the output of said coincidence circuit.

3. Apparatus as in claim 2 wherein said coincidence circuit comprises, a gaseous discharge tube having at least a cathode, an anode and a grid, the output of said second receiver being applied to said grid for causing conduction of said discharge tube, the output of said detecting and integrating means being applied across said discharge tube in parallel with said modulating means.

4. Apparatus as in claim 3 including a transformer, a pulse storage line connected between said anode and the primary of said transformer, conduction of said tube causing discharge of said storage line through said tube and said transformer primary, the secondary of said transformer being connected to said transmitter for modulating the output thereof.

5. A radio beacon system for use with a remote radar station radiating interrogating pulses from a conical scanning antenna at two different pulse repetition rates on two different carrier frequencies respectively, comprising, a first receiver responsive to pulse signals radiated at the faster pulse repetition rate, a modulation detector connected to the output of said first receiver to provide an output voltage varying in amplitude with the strength of signals received from said conical scanning antenna, a second receiver responsive to pulse signals radiated at the slower of said pulse repetition rates, a radio transmitter, and a modulator responsive to the output of said modulation detector and activated by the output of said second receiver to modulate said transmitter for the transmission of a series of amplitude modulated pulses corresponding to the modulation of pulses received by said first receiver.

6. A radio beacon system for use with a remote radar station radiating interrogating pulses from a conical scanning antenna at a first pulse repetition rate on a first carrier frequency and at a second slower repetition rate on a second carrier frequency, comprising, a first receiver responsive to pulse signals radiated on said first carrier frequency, a modulation detector and integrator connected to the output of said first receiver to provide an output voltage varying in amplitude with the strength of signals received from said conical scanning antenna, a second receiver responsive to pulses radiated on said second carrier frequency, a radio transmitter, and a modulator responsive to the output of said modulation detector and activated by output of second receiver to modulate said transmitter for the radiation of a series of amplitude modulated pulses corresponding to the modulation of pulses received by said first receiver.

7. Apparatus as in claim 6 wherein said modulator includes a gaseous discharge tube having at least a cathode, an anode and a grid, the output of said second receiver being applied to said grid for causing conduction of said discharge tube, the output of said modulation detector and integrator being applied across said discharge tube in parallel with said modulator.

8. Apparatus as in claim 6 including a transformer, a pulse storage line connected between said anode and the primary of said transformer, a conduction of said tube causing discharge of said storage line through said tube and said transformer primary, the secondary of said transformer being connected to said transmitter for modulating the output thereof.

9. A radio beacon system for use with a remote radar station which radiates a conically scanning directional beam of constant amplitude interrogating pulses of a first radio frequency at a first repetition rate and periodically simultaneously therewith pulses of a second radio frequency at a repetition rate which is a submultiple of said first rate comprising, in combination, a first receiver for receiving pulses of said first radio frequency, detecting means coupled to said receiver for providing a control signal whose amplitude is modulated in accordance with the amplitude variations in the pulses of said first radio frequency arriving at said receiver, which variations are caused by the scanning motion of said directional beam, a second receiver for receiving pulses of said second radio frequency, means for intercoupling said receivers so that said second receiver is conditioned to pass pulses of said second radio frequency from its input to its output circuit whenever pulses of said first radio frequency are simultaneously received by said first receiver, a transmitter, a modulator responsive to said control signal and activated by a pulse in the output circuit of said second receiver for triggering said transmitter to cause the radiation of a reply pulse having an amplitude proportional to that of the pulse of said first radio frequency last received by said first receiver.

References Cited in the file of this patent

UNITED STATES PATENTS

| | | |
|---|---|---|
| 1,894,019 | Buckley | Jan. 10, 1933 |
| 2,132,599 | Baumann et al. | Oct. 11, 1938 |
| 2,252,083 | Luck | Aug. 12, 1941 |
| 2,321,698 | Nolde | June 15, 1943 |
| 2,333,688 | Shepard | Nov. 9, 1943 |
| 2,415,667 | Wheeler | Feb. 11, 1947 |
| 2,415,919 | Thomas | Feb. 18, 1947 |
| 2,425,316 | Dow | Aug. 12, 1947 |
| 2,441,956 | Deloraine et al. | May 25, 1948 |
| 2,492,137 | Dodington | Dec. 27, 1949 |
| 2,548,813 | Perkins et al. | Apr. 10, 1951 |